United States Patent
Bromley et al.

(10) Patent No.: US 7,694,088 B1
(45) Date of Patent: Apr. 6, 2010

(54) SYSTEM AND METHOD FOR EFFICIENT CREATION OF AGGREGATE BACKUP IMAGES

(75) Inventors: Graham Bromley, Dublin, CA (US); Kirk W. Clowser, Dellwood, MN (US)

(73) Assignee: Symantec Operating Corporation, Mountain View, CA (US)

( * ) Notice: Subject to any disclaimer, the term of this patent is extended or adjusted under 35 U.S.C. 154(b) by 505 days.

(21) Appl. No.: 11/095,320

(22) Filed: Mar. 31, 2005

(51) Int. Cl.
 *G06F 12/00* (2006.01)
 *G06F 13/00* (2006.01)
 *G06F 13/28* (2006.01)

(52) U.S. Cl. ................................................... 711/162
(58) Field of Classification Search ................... 711/162
 See application file for complete search history.

(56) References Cited

U.S. PATENT DOCUMENTS

| | | | | |
|---|---|---|---|---|
| 5,193,168 | A * | 3/1993 | Corrigan et al. | 707/100 |
| 5,522,037 | A * | 5/1996 | Kitagawa et al. | 714/40 |
| 5,581,724 | A * | 12/1996 | Belsan et al. | 711/114 |
| 5,638,527 | A * | 6/1997 | Parks et al. | 711/202 |
| 5,758,359 | A * | 5/1998 | Saxon | 707/204 |
| 5,852,713 | A * | 12/1998 | Shannon | 714/6 |
| 6,223,269 | B1 * | 4/2001 | Blumenau | 711/202 |
| 6,240,527 | B1 * | 5/2001 | Schneider et al. | 714/21 |
| 6,421,767 | B1 * | 7/2002 | Milillo et al. | 711/162 |
| 6,460,054 | B1 * | 10/2002 | Grummon | 707/204 |
| 6,487,561 | B1 * | 11/2002 | Ofek et al. | 707/204 |
| 6,542,909 | B1 * | 4/2003 | Tamer et al. | 707/205 |
| 6,549,992 | B1 * | 4/2003 | Armangau et al. | 711/162 |
| 6,615,365 | B1 * | 9/2003 | Jenevein et al. | 714/6 |
| 6,625,623 | B1 * | 9/2003 | Midgley et al. | 707/204 |
| 6,629,110 | B2 * | 9/2003 | Cane et al. | 707/204 |
| 6,631,478 | B1 * | 10/2003 | Wang et al. | 714/15 |
| 6,665,779 | B1 * | 12/2003 | Polfer | 711/162 |
| 6,704,755 | B2 * | 3/2004 | Midgley et al. | 707/204 |
| 6,934,822 | B2 * | 8/2005 | Armangau et al. | 711/162 |

(Continued)

OTHER PUBLICATIONS

Mike Rubel; "Easy Automated Snapshot-Style Backups with Linux and Rsync"; Jun. 07, 2002; pp. 1-14 http://web.archive.org/web/20020607134739/http://www.mikerubel.org/computers/rsync_snapshots/.*

(Continued)

*Primary Examiner*—Matt Kim
*Assistant Examiner*—Christopher D Birkhimer
(74) *Attorney, Agent, or Firm*—Meyertons, Hood, Kivlin, Kowert & Goetzel, P.C.; B. Noel Kivlin

(57) ABSTRACT

A system for efficient creation of aggregate backup images includes a plurality of backup images of a source data set, including a first and a second backup image, and a backup manager. The second backup image may include at least one data block containing an updated version of a corresponding data block in the first backup image. The backup manager may be configured maintain a first and a second image map corresponding to the first and second backup images, respectively, where each image map includes a plurality of entries pointing to data blocks of the corresponding backup image. In response to a request to create a first aggregate backup image of the source data set, the backup manager may be configured to establish a first aggregate image map including indirect pointers that point to one or more entries in each of the first and second image maps.

21 Claims, 16 Drawing Sheets

U.S. PATENT DOCUMENTS

| | | |
|---|---|---|
| 6,976,039 B2 | 12/2005 | Chefalas et al. |
| 6,985,915 B2 | 1/2006 | Somalwar et al. |
| 7,007,143 B2 | 2/2006 | Cochran |
| 7,162,599 B2 * | 1/2007 | Berkowitz et al. ........... 711/162 |
| 7,191,304 B1 * | 3/2007 | Cameron et al. ............. 711/202 |
| 7,266,572 B2 * | 9/2007 | Vishlitzky et al. ........... 707/201 |
| 2002/0049883 A1 * | 4/2002 | Schneider et al. ........... 711/100 |
| 2002/0143733 A1 * | 10/2002 | Mukkamalla et al. .......... 707/1 |
| 2002/0174236 A1 * | 11/2002 | Mathur et al. ............... 709/229 |
| 2002/0178335 A1 * | 11/2002 | Selkirk et al. ............... 711/162 |
| 2003/0115414 A1 * | 6/2003 | Tomita ........................ 711/114 |
| 2003/0135783 A1 * | 7/2003 | Martin et al. ................. 714/13 |
| 2003/0158873 A1 * | 8/2003 | Sawdon et al. ............... 707/204 |
| 2003/0163495 A1 * | 8/2003 | Lanzatella et al. ........... 707/204 |
| 2004/0015672 A1 * | 1/2004 | Masse ........................ 711/173 |
| 2004/0034736 A1 * | 2/2004 | Horn .......................... 711/114 |

OTHER PUBLICATIONS

Chapter 13, "Backing Up File Systems With fssnap," Solaris 8 System Administration Supplement, Apr. 2001, pp. 51-57.

* cited by examiner

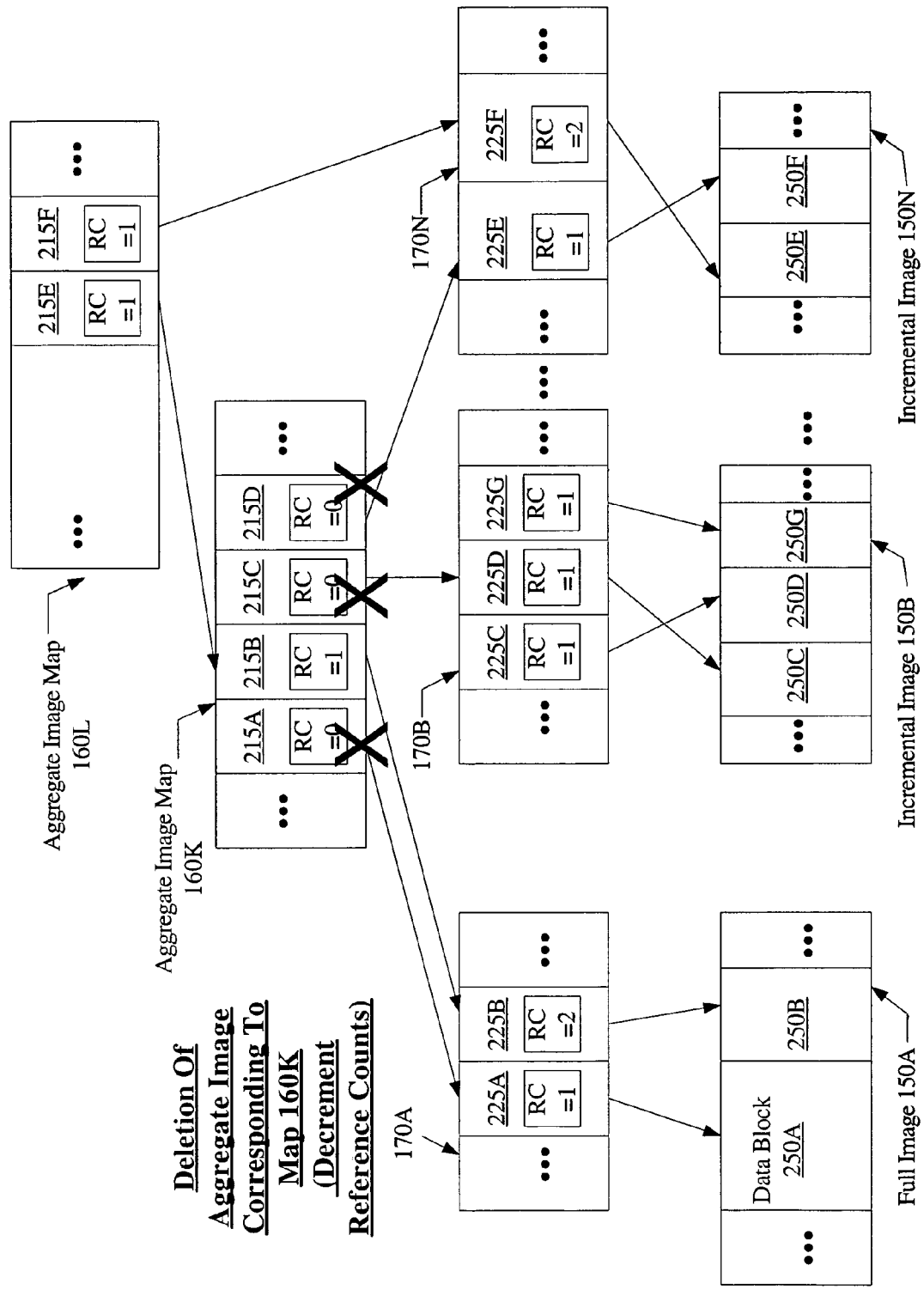

Computer Readable Medium 1010

Backup Software 1020

FIG. 10

SYSTEM AND METHOD FOR EFFICIENT CREATION OF AGGREGATE BACKUP IMAGES

BACKGROUND OF THE INVENTION

1. Field of the Invention

This invention relates to computer systems and, more particularly, to backup management within computer systems.

2. Description of the Related Art

Many business organizations and governmental entities rely upon applications that access large amounts of data, often exceeding many terabytes of data, for mission-critical applications. Numerous different types of storage devices, potentially from multiple storage vendors, with varying functionality, performance and availability characteristics, may be employed in such environments.

Any one of a variety of failures, such as system crashes, hardware storage device failures, and software defects, may potentially lead to a corruption or a loss of critical data in such environments. In order to recover from such failures, various kinds of backup techniques may be employed. Traditionally, for example, backup images of critical data may have been created periodically (e.g., once a day) and stored on tape devices. As prices for random access media such as disk devices have continued to fall, some information technology (IT) organizations have begun to use random access media for storing backup images as well. In some storage environments, multiple layers of storage may be dedicated to storing backup images: e.g., backup images may be stored on disk or on a particular type of tape device initially, and staged periodically to a second type of tape device or other secondary media for long-term storage.

Backup solution vendors may allow users to create different types of backup images for a given data source (e.g., one or more file systems or logical volumes), such as full images and incremental images. A full image may include a complete copy of the data source, e.g., a copy of all the files within one or more file systems, and so may be used to restore the state of the data source as of the time the full image was created, without a need to access any other backup image. An incremental image may include changes that may have occurred at the data source over a period of time (e.g., over a period of time since a previous backup image was created), rather than the full contents of the data source, and may therefore typically require less storage than a full image. In general, backup images may typically be created and managed as part of a chain or sequence, where the chain includes at least one full backup image, and incremental images may be used in combination with a previously created full image within the chain to restore the state of the data source.

For example, in one environment, a full image ("F-Sun") of a data source may also be created every Sunday, and incremental images (e.g., "I-Mon", "I-Tue", "I-Wed") may be created every other day of the week. In this example, information contained within "I-Wed" may have to be combined not only with information contained within "F-Sun", but also with information contained within all intermediate incremental images (i.e., "I-Mon" and "I-Tue"), in order to restore the state of the data source as of Wednesday. That is, an incremental image may only contain information on the changes affecting backup that may have occurred at the data source since an immediately previous backup image of any kind was created. The immediately previous image may be another incremental image or a full image. Restoration using a given incremental image may therefore typically require processing several backup images.

The growing size of data sources may lead to an increased reliance on incremental images rather than frequent creation of full images in many storage environments, especially where random-access media are used for the backup images. For example, as a result of the large storage costs associated with creating traditional full images, backup management staff may reduce the frequency at which full images are created, and create relatively long backup image chains consisting largely of incremental images. As the length of a given chain of backup images increases, however, storage costs for obsolete or redundant data blocks within incremental images themselves may become significant, and the total time required for restoration may also increase. Frequently changed blocks of the source data set may have to be included within several incremental images in a given chain. For example, if data block "B" of a data source happens to be modified on Monday, Tuesday, and Wednesday in a storage environment where incremental images are created every day, the incremental images for each of the three days may include a copy of data block B. Even though the versions of data block B stored in the incremental images for Monday and Tuesday in this example may be obsolete once the incremental image for Wednesday is created (i.e., even though the Monday and Tuesday versions may no longer be needed to restore the latest backed-up state of the data source after the Wednesday incremental image is created), the obsolete versions may still occupy storage space.

In order to reduce total backup storage requirements (e.g., by eliminating obsolete copies of data blocks within old incremental images), and to simplify management of backup image chains in general, techniques to create consolidated full images from an existing chain of images may be employed. Traditionally, such techniques have required extensive data copying, for example by first duplicating an existing full image from the chain, and then applying changes from succeeding incremental images in sequence to the duplicated full image. The time and storage required for such consolidations that involve copying data blocks from existing backup images may become prohibitive, especially for large data sources and long backup image chains.

SUMMARY

Various embodiments of a system and method for efficient creation of aggregate backup images are disclosed. According to a first embodiment, the system includes a plurality of backup images of a source data set, including a first backup image and a second backup image, and a backup manager. The source data set may comprise any combination of a variety of logical and/or physical storage objects in different embodiments, such as one or more file systems, logical volumes, files, raw devices, database tablespaces or LUNs. The second backup image may include at least one data block containing an updated version of a corresponding data block in the first backup image. For example, in one embodiment, the first backup image may be a full image including a backed-up version of all the data blocks of the source data set, while the second backup image may be an incremental image including one or more blocks of the source data set that have changed since the first backup image was created. The backup manager may be configured to maintain a first image map and a second image map corresponding to the first and second backup images, respectively, wherein each image map may include a plurality of entries pointing to data blocks of the corresponding backup image. In response to a request to create a first aggregate backup image of the source data set, the backup manager may be configured to establish a first aggregate image map including indirect pointers that point to one or more entries in each of the first and second image maps.

In this manner, for example, an aggregate image map that indirectly points to the most recently backed up versions of each data block of the source data set (i.e., via entries in other image maps) may be established, allowing a backup consumer such as a restoration tool to efficiently access all the data blocks of the source data set by following the indirect pointers. In addition to the aggregate image map, image metadata and/or catalogs may also be established by the backup manager in some embodiments, and the aggregate image may comprise the combination of the aggregate image map and its associated metadata in such embodiments. An aggregate image whose image map includes indirect pointers to all the data blocks of the source data set may be termed a "synthetic full backup image" of the source data set. The establishment of a synthetic full backup image may be accomplished without copying data blocks of existing full and incremental images in some embodiments, and may therefore be established more quickly and with lower computing and/or storage resource utilization than a conventional consolidated full image map, which may require data blocks from a full image to be copied and changes from one or more incremental images to be applied to the copied data blocks.

According to one embodiment, aggregate backup image maps may be built using a hierarchy of other image maps, including other aggregate image maps as well as image maps corresponding to full and/or incremental backup images. That is, entries within a given aggregate image map may include pointers to entries within another aggregate image map, which may in turn include entries with pointers to other aggregate image maps (or to image maps corresponding to full or incremental images), and so on. In one embodiment, for example, the plurality of backup images may include a third backup image with its associated third image map. In response to a request to create a second aggregate backup image, the backup manager may be configured to establish a second aggregate image map including a first indirect pointer to an entry in the first aggregate image map and a second indirect pointer to an entry in the third image map. In general, a given aggregate image map may include pointers to entries within any desired set of related image maps (e.g., image maps that correspond to one or more full or incremental backup images of a chain of images of a source data set, as well as aggregate image maps formed using the image maps of the full or incremental images).

According to another embodiment, an image map entry may include a reference count indicative of the number of backup images that reference the image map entry. Reference counts may be maintained for entries of aggregate image maps, as well as for entries of image maps corresponding to full or incremental backup images. When a new aggregate image map is established, reference counts of image map entries pointed to by the entries of the aggregate image map may be incremented. When a request to delete a given aggregate image map is received, the backup manager may decrement the reference counts of the entries of the aggregate image map. In addition, in some embodiments the backup manager may be configured to recursively decrement the reference counts of each entry pointed to by an entry in the aggregate image map for which a deletion request was received. If the decremented reference count of a given image map entry reaches a specified threshold (such as zero) in some embodiments, the image map entry may be deleted, and if the image map entry points directly to a data block of a backup image, the data block may be deleted as well. Similarly, when a request to delete a given full or incremental backup image (rather than an aggregate backup image) is received, the backup manager may be configured to decrement the reference counts of the entries in the corresponding image map, and to delete the entry and its associated data block if the decremented reference count reaches a specified threshold. Image map entries whose decremented reference counts do not reach the specified threshold may be allowed to remain, thus ensuring that image maps and data blocks that are still being referenced by existing aggregate image maps do not get inadvertently deleted. At the same time, by removing or deleting image map entries and corresponding data blocks whose reference counts indicate that the image map entries and data blocks are no longer referenced by other image maps, the amount of storage used for storing redundant or obsolete backup images may be reduced. The storage used for backup images and/or their associated image maps may include one or more random access storage devices such as disks in some embodiments.

BRIEF DESCRIPTION OF THE DRAWINGS

FIG. 7*a*-FIG. 7*e* are block diagrams illustrating exemplary operations that may be performed during deletion operations on backup images and their respective image maps, according to one embodiment.

FIG. 10 is a block diagram illustrating a computer accessible medium according to one embodiment.

Figure 1:
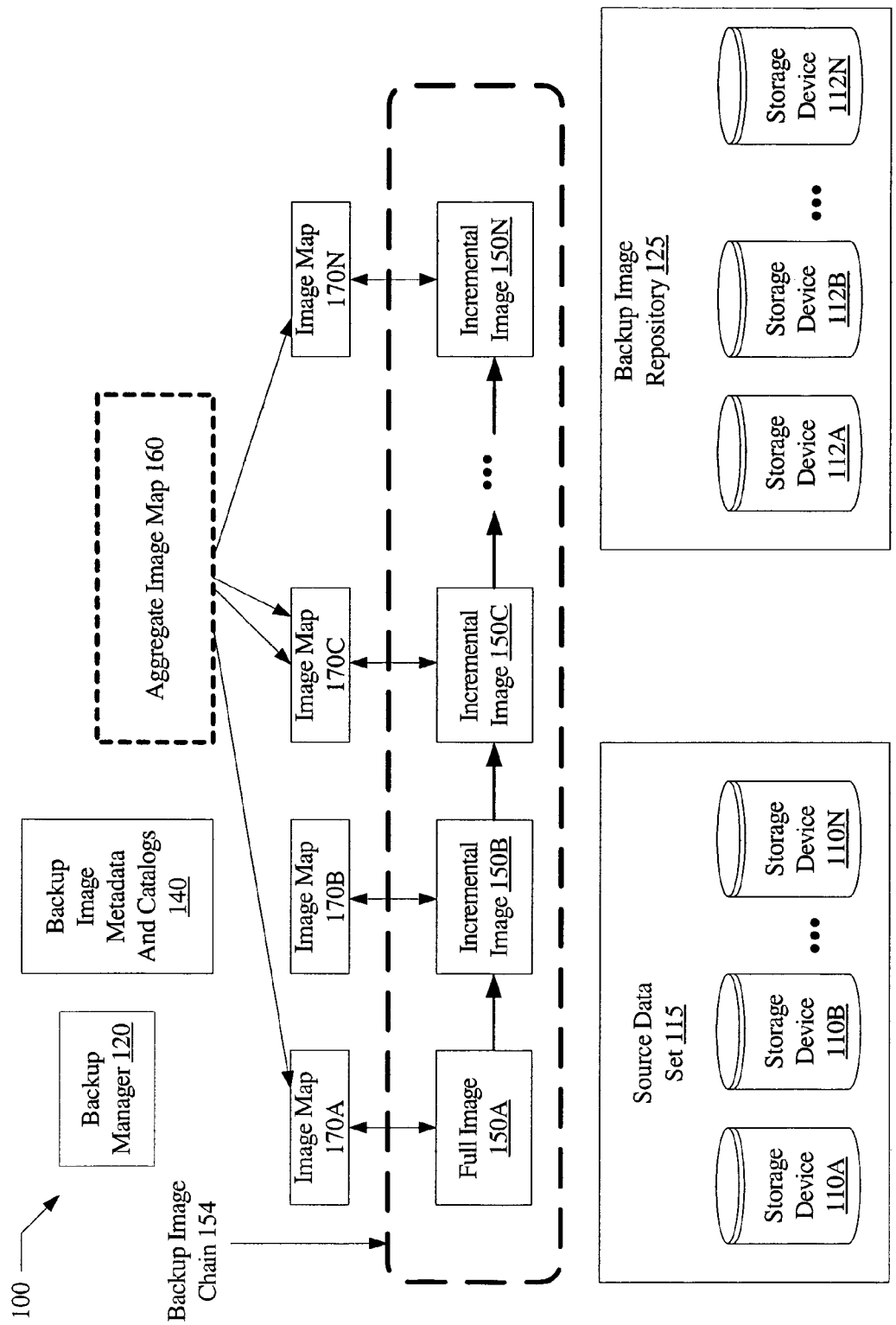
FIG. 1 is a block diagram illustrating one embodiment of a system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 is a block diagram illustrating a system 100 according to one embodiment. As shown, system 100 includes a plurality of backup images of a source data set 115 including a full image 150A and incremental images 150B, 150C, ... 150N (which may be collectively referred to herein as backup images 150), and a backup manager 120. Source data set 115 may include a variety of logical and/or physical storage devices 110 (i.e., 10A ... 10N) of which backup images may be created, including, for example, one or more file systems, individual files, raw devices, logical volumes, database storage devices such as tablespaces, or LUNs (Logical Units). Full image 150A may include a version of all the data blocks within source data set 115, while incremental images 150B, 150C, ... 150N may each include only a subset of data blocks of source data set 115, each incremental image reflecting changes made to the source data set 115 since the immediately previous (fill or incremental) backup image was created. Thus, full image 150A and incremental images 150B ... 150N may form a backup image chain 154 consisting of temporally related backup images, such that successive incremental images in the chain reflect more recent changes in underlying source data set 115. For example, incremental image 150B may include an updated version of a data block present in full image 150A, incremental image 150C may include an updated version of a data block present in full image 150A or in incremental image 150B, etc. In some embodiments, the backup images 150 of backup image chain 154 may be stored in a backup repository 125, which may in turn include a variety of logical and/or physical storage devices 112 (i.e., 112A ... 112N), such as file systems, logical volumes, disk arrays, disks, or tape devices. Backup manager 120 may be configured to maintain metadata and/or catalogs 140 on the backup images of backup image chain 154, for example in a backup metadata database.

Figure 2:
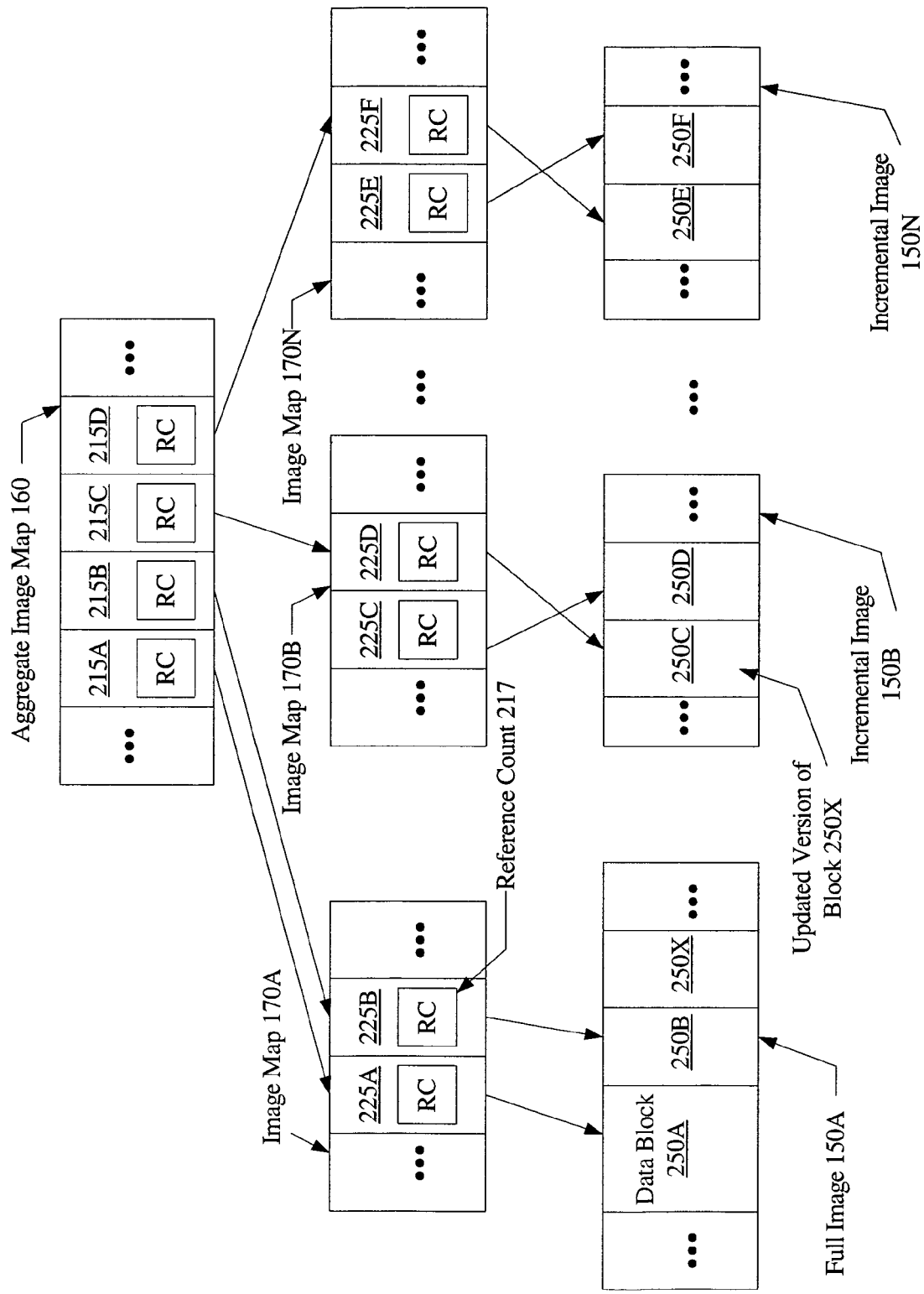
FIG. 2 is a block diagram illustrating details of the entries included within an exemplary aggregate image map and the image map entries pointed to by the aggregate image map entries, according to one embodiment.

In the embodiment depicted in FIG. 1, backup manager 120 may be configured to maintain an image map 170 corresponding to each backup image 150 in backup image chain 154. For example, image map 170A may be maintained for full backup image 150A, image map 170B for incremental image 150B, image map 170C for incremental image 150C, etc. Each image map 170 may include a plurality of entries, where each entry points to a corresponding block of data within the backup image 150 corresponding to the image map, as illustrated in FIG. 2 and described in further detail below. In response to a request to create an aggregate backup image, backup manager 120 may be configured to establish an aggregate image map 160 including a plurality of indirect pointers. The indirect pointers may point, for example, to entries within image maps 170 which in turn point to backed up versions of data blocks within backup images 150. (The pointers in the entries of aggregate image map 160 may be termed "indirect" because they do not point directly to data blocks, unlike the pointers in entries of image maps 170). In addition to establishing the aggregate image map, in some embodiments, backup manager 120 may also generate metadata associated with the aggregate backup image. In such an embodiment, an aggregate backup image may comprise the aggregate image map 160 as well as associated metadata, which may, for example, be stored along with other backup image metadata and catalogs 140. After the aggregate image map 160 has been established and associated metadata has been created, the entity that requested the creation of the aggregate backup image (such as a backup consumer application) may be given access to the aggregate image map 160 and/or to the associated metadata.

In one embodiment, an aggregate image map 160 may include indirect pointers to the latest backed up versions of all data blocks present in the source data set 115; that is, it may be possible to access the latest version of each data block of source data set 115 for which a backup was created by following the pointers included within the aggregate image map 160 to entries within image maps 170, and by following the pointers within image maps 170 to the underlying data blocks of backup images 150. In such an embodiment, the aggregate image corresponding to the aggregate image map 160 may be termed a "synthetic full image", as all the backed-up data blocks of the underlying source data set may be accessed using the aggregate image map. While the generation of a consolidated traditional full image from a chain of images such as backup image chain 154 may require extensive copying of data blocks (e.g., first copying the data blocks of a full image 150A, then copying changed or added data blocks from successive incremental images), in such embodiments a logically equivalent synthetic full image based on pointers may be established without copying data blocks. As a result, synthetic full image creation may require fewer computing and storage resources, and may take a much shorter amount of time, than the establishment or generation of a traditional full image consolidated from a chain of existing backup images in some embodiments.

In other embodiments, an aggregate image map 160 may be created for any desired subset of data blocks of source data set 115, and may not include pointers corresponding to all data blocks of source data set 115. For example, in one implementation, backup manager 120 may provide an interface to specify a set of rules for identifying a subset of data blocks for which an aggregate backup image is desired, and may be configured to select the data blocks and set of entries within image maps 170 based on specified rules. A number of different types of selection criteria may be specified using such an interface, such as criteria based on file or directory names (e.g., portions such as prefixes of directory path names or file path names, or file name extensions), frequency of access of the underlying data block, frequency of update, time of latest update, or other attributes associated with the data block.

In one embodiment, backup manager 120 may be configured to create image maps 170 as soon as the corresponding backup image 150 is created, while in another embodiment, image maps 170 may be created on demand, e.g., when a request to create an aggregate image is received by backup manager 120. As described in further detail below, in some embodiments, each entry within an image map 170 (or within an aggregate image map 160) may include a reference count indicative of the number of backup images that refer to the entry. In addition, in some embodiments, additional information may be maintained within each map entry, such as metadata on the corresponding data block (e.g., when the data block was last updated, ownership information, etc.).

FIG. 2 is a block diagram illustrating further details of the entries included within an exemplary aggregate image map 160 and the image map entries pointed to by the aggregate image map entries, according to one embodiment. As shown, full image 150A may include a plurality of backed up versions of data blocks, including data block 250A, 250B and 250X. Incremental image 150B may include data blocks 250C and 250D, while incremental image 150N may include data blocks 250E and 250F. Backup manager 120 may maintain image maps 170A, 170B and 170N corresponding to backup images 150A, 150B and 150N, as well as other image maps corresponding to other backup images not shown in FIG. 2. Each entry 225 within an image map 170 may include a pointer to a corresponding data block 250, as well as a reference count 217. Aggregate image map 160 may also include a plurality of entries 215 with indirect pointers that point to entries within image maps 170. Entries 215 may also include reference counts in some embodiments. In the exemplary aggregate image map 160 illustrated in FIG. 2, entry 215A includes a pointer to entry 225A of image map 170A, which in turn points to data block 250A of full image 150A. Similarly, entry 215B of aggregate image map 160 points to entry 225B of image map 170A, which points to data block 250B of full image 150A. Entries 215C and 215D of aggregate image map 160 point to entries 225D and 225F of image maps 170B and 170N, respectively. Entry 225D of image map 170B points to data block 250C of incremental image 150B, and entry 225F of image map 170N points to entry 250E of incremental image 150N. In the example illustrated in FIG. 2, data block 250C is an updated version of data block 250X of full image 150A. Further details of how reference counts 217 are modified and used are provided below. It is noted that only a few exemplary image map entries and underlying data blocks are shown in FIG. 2 for clarity (for example, even though an entry corresponding to data block 250X may exist in image map 170A, it is not shown in FIG. 2).

As indicated in the example illustrated in FIG. 2, the order of entries within a given image map 170 may not match the order in which the underlying data blocks are stored within backup images. In some embodiments, the entries of an image map 170 and/or an aggregate image map 160 may be organized in logical address order, and in some implementations the image map may include an index to the entries. However, the underlying data blocks pointed to by the entries in the image map may be stored in an arbitrary order, i.e., not necessarily in logical address order. Thus, for example, in FIG. 2, entry 225C of image map 170B preceded entry 225D in the image map, but the data block 250C corresponding to entry 225D may precede the data block 250D corresponding to image map entry 225C in the underlying backup image. In some embodiments, each image map entry 225 (or 215) may correspond to a fixed amount of data in the underlying backup image. For example, in one implementation, an image map entry may be created for each 64 Kilobytes of the underlying backup image. In other embodiments, the data blocks pointed to by different image map entries 225 may vary in size; e.g., data block 250A pointed to by image map entry 225A may include 256 Kilobytes of the underlying full image 150A, while data block 250B may be 64 Kilobytes in size, data block 250X may be 128 Kilobytes in size, etc.

FIG. 2 also illustrates how aggregate image map 160 may exclude pointers to obsolete data blocks within a backup image chain: for example, aggregate image map 160 includes a pointer from entry 215C to data block 250C via entry 225D, but does not include a pointer to data block 250X, since data block 250C is an updated version of data block 250X. Thus, as also described earlier, aggregate map 160 may include indirect pointers only to the latest versions of its backed up data blocks 250, as of the time the aggregate map was established, and may allow a backup consumer such as a restoration application to efficiently access an up-to-date version of each underlying data block by following pointers to existing data blocks within previously created full or incremental backup images.

Figure 3:
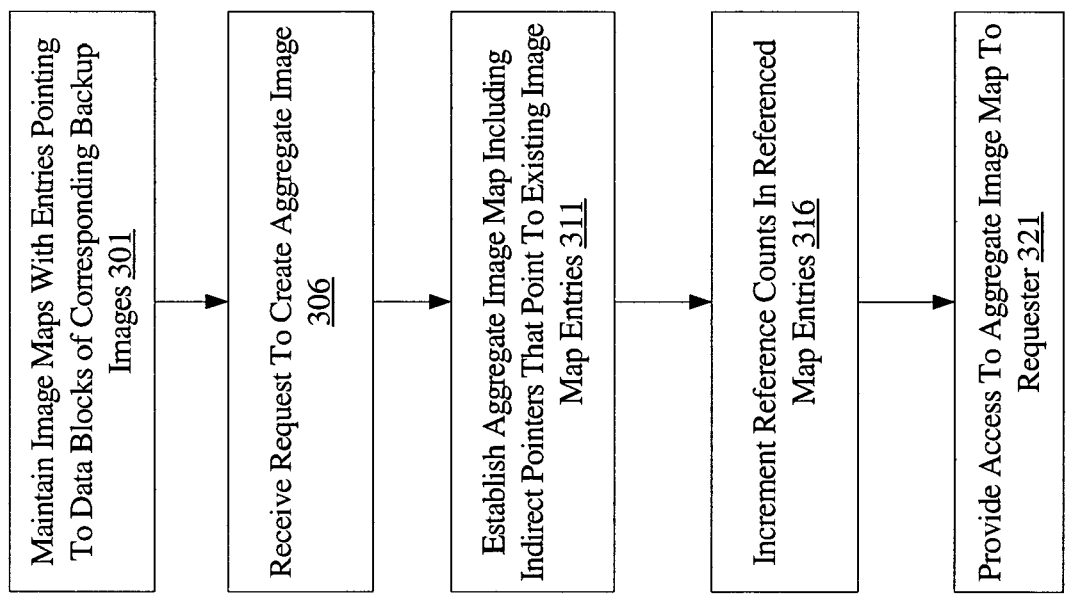
FIG. 3 is a flow diagram illustrating aspects of the operation of a backup manager according to one embodiment.

FIG. 3 is a flow diagram illustrating aspects of the operation of backup manager 120 according to one embodiment. As shown in block 301 of FIG. 3, backup manager 120 may be configured to maintain image maps 170 including entries 225 pointing to data blocks of corresponding backup images 150 of source data set 115. As noted above, in some embodiments, an image map 170 may be created by backup manager 120 whenever a new backup image 150 is created, for example based on a backup schedule specified by a user, while in other embodiments, image maps 170 may be created on demand, e.g., when backup manager 120 receives a request to create an aggregate image. Image maps 170 may be stored together with their corresponding backup images (e.g., within the same file system or logical volume as the corresponding backup image 150) in some embodiments, while they may be stored in a separate storage device or map repository in some embodiments. In one implementation, part or all of an image map 170 may be stored in a compressed format to reduce storage space allocation for the image map. Each image map entries 225 may include a reference count indicative of the number of backup images (including aggregate backup images corresponding to aggregate image maps) referencing the entry in some embodiments. In such embodiments, the reference count for each image map entry may be initialized to a specified value (such as '0' or '1') when the image map is created.

Backup manager 120 may be configured to receive a request to create an aggregate image, such as a synthetic full image, as shown in block 306 of FIG. 3. The request may be generated by an administrator in some embodiments, e.g., when the administrator perceives that the number of images in a chain of backup images is becoming excessive and the backup images need to be consolidated. In other embodiments, the request to create an aggregate image may be triggered automatically, e.g., based on a schedule or on other factors such as the total amount of storage space used for an existing chain of backup images, or the amount of storage space used for the backup image chain relative to the size of the source data set. In some embodiments, backup manager 120 may be configured to provide an interface to allow scheduling of full, incremental as well as aggregate image creations. In one embodiment, a backup consumer such as a restoration or disaster recovery application may be configured to issue requests to backup manager 120 for the creation of an aggregate image. For example, in such an embodiment, a restoration application may be configured to periodically estimate how long a restoration of source data set 115 may take using a given growing chain of backup images, and the restoration application may send a request to backup manager 120 to create an aggregate image when the estimated time to complete the restoration exceeds a threshold value. As noted earlier, the request received by backup manager 120 may be for an aggregate image of the full set of data included in source data set 115 (i.e., for a synthetic full image) in some embodiments, while in other embodiments the request may be to create an aggregate image for a subset of the data of source data set 115.

On receiving the request to create the aggregate image, backup manager 120 may be configured to establish an aggregate image map 160 including indirect pointers that point to existing image map entries 225, as shown in block 311 of FIG. 3. The pointers included in the aggregate image map may be termed indirect in that they point to data blocks 250 through other image map entries 225, instead of pointing directly to the data blocks 250. The use of indirect pointers in conjunction with reference counts may, for example, allow backup manager 120 to ensure that deletions of full, incremental as well as aggregate images may be performed without inadvertent deletions of map entries and/or data blocks that are being referenced by existing aggregate image maps, as described below in further detail. In some embodiments, on receiving a request to create an aggregate image for a source data set 115, backup manager 120 may be configured to access backup image metadata and/or catalogs 140 to identify the set of existing backup images from which the aggregate image map 160 is to be constructed. The backup image metadata and/or catalogs 140 may also include information identifying objects (such as files) that may have been deleted from source data set 115 in some embodiments, allowing backup manager 120 to avoid creating entries for such deleted objects in aggregate image map 160.

In embodiments where image map entries 215 and/or 225 include reference counts 217, backup manager 120 may be configured to increment the reference counts 217 of entries referenced by the newly created entries of aggregate image map 160, as illustrated in block 316 of FIG. 3. Examples and further details about incrementing reference counts 217 during creation of aggregate maps are provided below in conjunction with the descriptions of FIGS. 6a-6c. Finally, after the aggregate image map 160 has been established, backup manager 120 may be configured to allow the requester of the creation of the aggregate image to access the aggregate image map, as shown in block 321 of FIG. 3. By following the indirect pointers provided in the entries of the aggregate image map 160, the requester may access the latest backed up versions of the data blocks for which the aggregate image was established.

Figure 4:
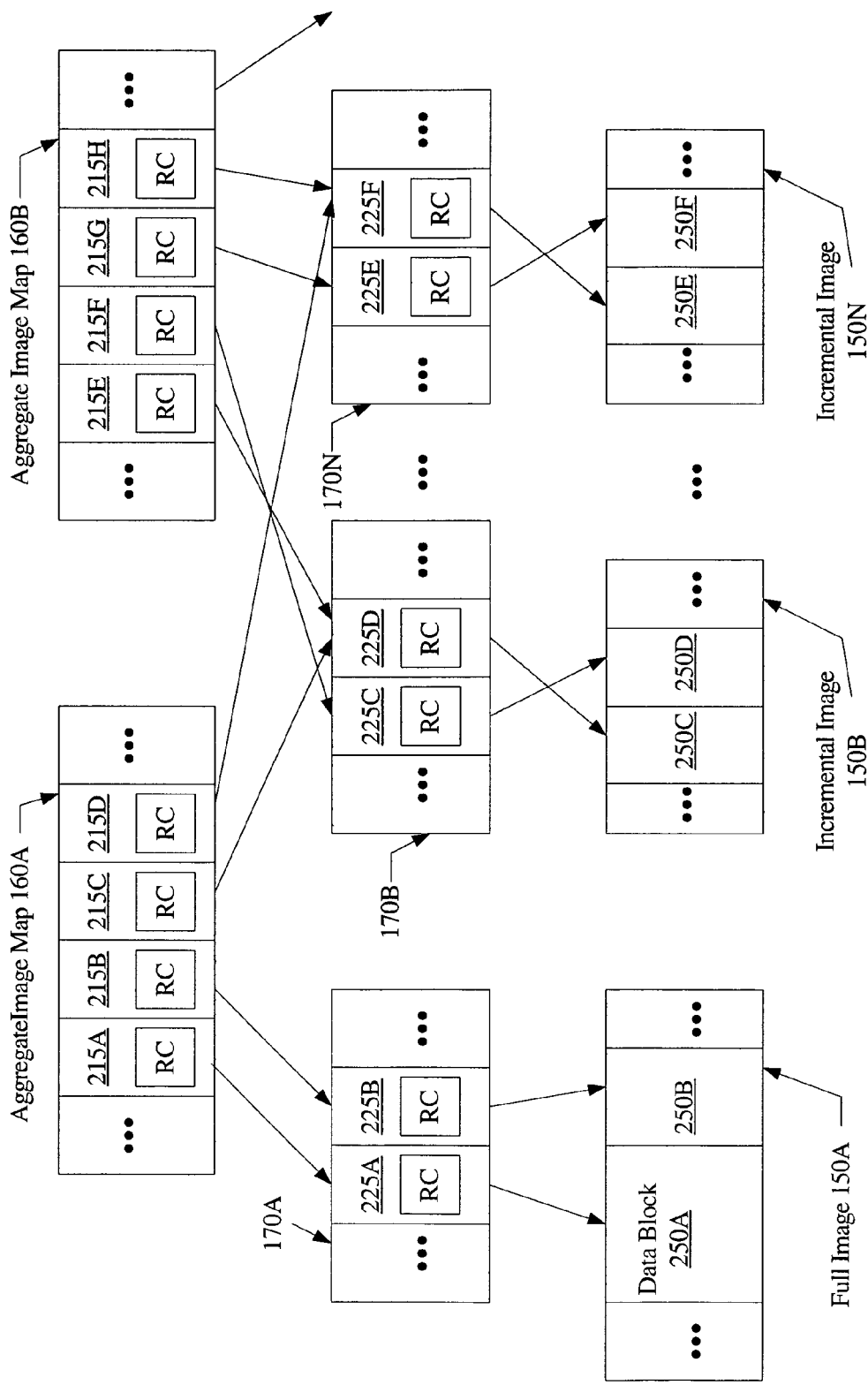
FIG. 4 is a block diagram illustrating exemplary aggregate image maps that include pointers to image maps corresponding to a single chain of backup images according to one embodiment.

In one embodiment, backup manager 120 may be configured to create and/or store multiple aggregate images and corresponding aggregate image maps 160 for a given chain of backup images. FIG. 4 is a block diagram illustrating exemplary aggregate image maps 160A and 160B that include pointers to image maps corresponding to a single chain of backup images according to one such embodiment. In the depicted example, aggregate image 160A may include pointers to entries within image maps 170A, 170B and 170N, corresponding to backup images 150A, 150B and 150N, while aggregate image map 160B may include pointers to entries within image maps 170B, 170N and one or more other image maps (not shown) that correspond to backup images created after image 150N in the chain consisting of backup images 150. In some embodiments, the two aggregate image maps 160A and 160B may be created at the request of different backup consumers, or at different times at the request of the same backup consumer. In addition, in some embodiments a different criterion may be used to select the data blocks of source data set 115 for which aggregate image map 160A is established than the criterion used to select the data blocks for which aggregate image map 160B is established. As shown in FIG. 4, in some embodiments, some aggregate image maps such as 160B may include pointers only to image maps corresponding to incremental images such as 150B and 150N, and may not include pointers to image maps corresponding to full images.

Figure 5:
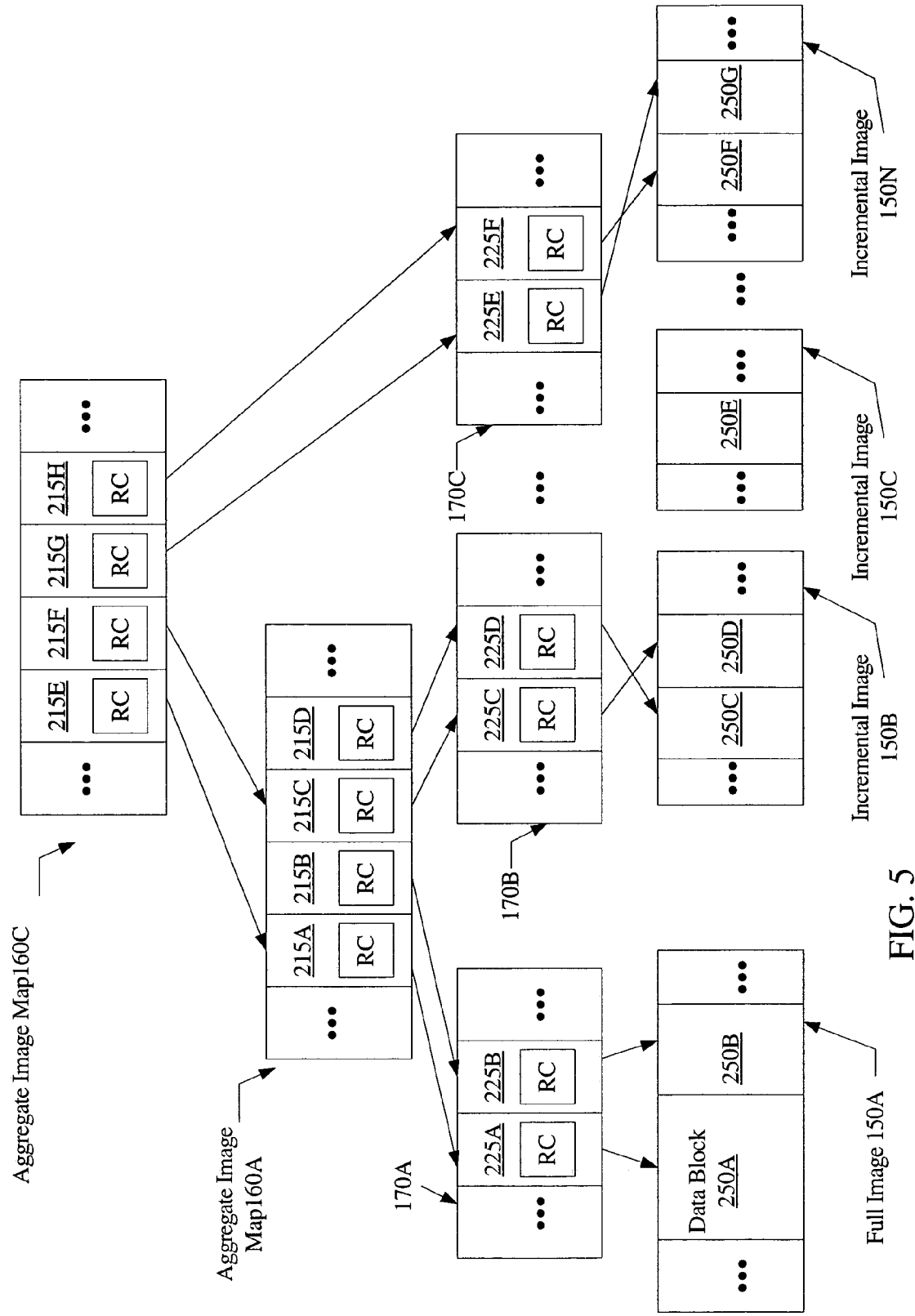
FIG. 5 is a block diagram illustrating an exemplary aggregate image map that may include pointers to another aggregate image map, according to one embodiment.

Multi-layer aggregate image maps 160 may be constructed by backup manager 120 in some embodiments; that is, an aggregate image map may include pointers to entries within one or more other aggregate image maps in such embodiments. FIG. 5 is a block diagram illustrating an exemplary aggregate image map 160C that may include pointers to another aggregate image map 160A, according to one such embodiment. As shown in FIG. 5, aggregate image map 160A may include pointers to entries within image maps 170A and 170B corresponding to a full image 150A and an incremental image 150B, respectively. Aggregate image map 160C may include entries 215E and 215F including pointers to entries 215A and 215C of aggregate image map 160C, which in turn point to entries 225A and 225C within image maps 170A and 170B. Entries 225A and 225C in turn point to data blocks 250A and 250D, respectively, within backup images 15A and 150B. Other entries in aggregate image map 160C, such as entries 215G and 215H, may include pointers to entries within image map 170C corresponding to an incremental image 150N, rather than to entries within other aggregate image maps. In general, since an aggregate image map 160 may include entries that point to entries within other aggregate image maps, as well as to entries within image maps 170 for incremental images or full images, the term "image map" may be used generically in the following description to refer to both aggregate image maps 160 as well as image maps 170 corresponding to true full backup images or incremental backup images. In various embodiments, a given aggregate image map 160 may include pointers to any desired collection of entries within other image maps, including one or more other aggregate image maps 160 (some of whose entries may point to entries within one or more other aggregate image maps) as well as image maps 170 corresponding directly to backup images 150. Thus, when following a pointer from a given entry of an aggregate image map 160 to a corresponding data block, multiple intermediate entries at different layers within a hierarchy of image maps 160 or 170 may be encountered. In some embodiments, when a choice may exist between using multi-layer aggregate image maps or using the underlying full and incremental image maps when establishing a requested aggregate image, backup manager 120 may be configured to allow a user to indicate a preference between the possible choices. In one specific embodiment, a user may specify a maximum or desired number of layers or a desired image map hierarchy structure for a requested aggregate image map.

As noted earlier, in some embodiments, a reference count 217 may be maintained within the entries of image maps 160 and 170. In general, a reference count 217 within a given entry of an image map may be indicative of the number of backup images that refer to the given entry. In some implementations, the backup image (e.g., a full, incremental, or aggregate image) for which the image map 160 or 170 is initially established may be included in the number of backup images counted to compute the reference counts 217 for the entries of the image map. For example, in one such implementation, reference counts 217 may be initialized to a default initial value of "1" when the image map 160 or 170 is created. In other implementations, the backup image for which the image map 160 or 170 is initially established may not be included in the reference counts, e.g., by using an initial reference count of "0" when the image map is created. Reference counts 217 may be stored in any desired format in different embodiments, such as in the form of an integer field, or encoded as a bitmap or some other form of encoding. In some embodiments, reference counts 217 may be both logically and physically included within image map entries, while in other embodiments, reference counts 217 that are logically included within image map entries may be stored in a separate data structure than the image map entries.

In some storage environments, in order to limit the amount of storage utilized for storing backed up data, backup images may be deleted from time to time, e.g., based on a deletion schedule set up by a backup administrator. Thus, for example, in one such storage environment, a backup deletion policy may demand that data blocks 250 of full and/or incremental backup images 150 that are no longer in use, or that have been made obsolete by blocks within newer backup images, be deleted after a specified amount of time, e.g., a week. Since aggregate image maps 160 for aggregate backup images may include pointers to data blocks within full and incremental backup images 150, a technique that prevents data blocks 250 that are currently being referenced by an aggregate image map 160 from being deleted may be implemented in such storage environments. In addition, it may also be desirable to delete data blocks 250 of full and/or incremental images 150 that are not being referenced from any aggregate image maps 160, when a request to delete the corresponding full or incremental image 150 is received. As illustrated in FIG. 6a-FIG. 6c and FIG. 7a-FIG. 7e, reference counts 217 may be used to implement both of these features in some embodiments.

Figure 6A:
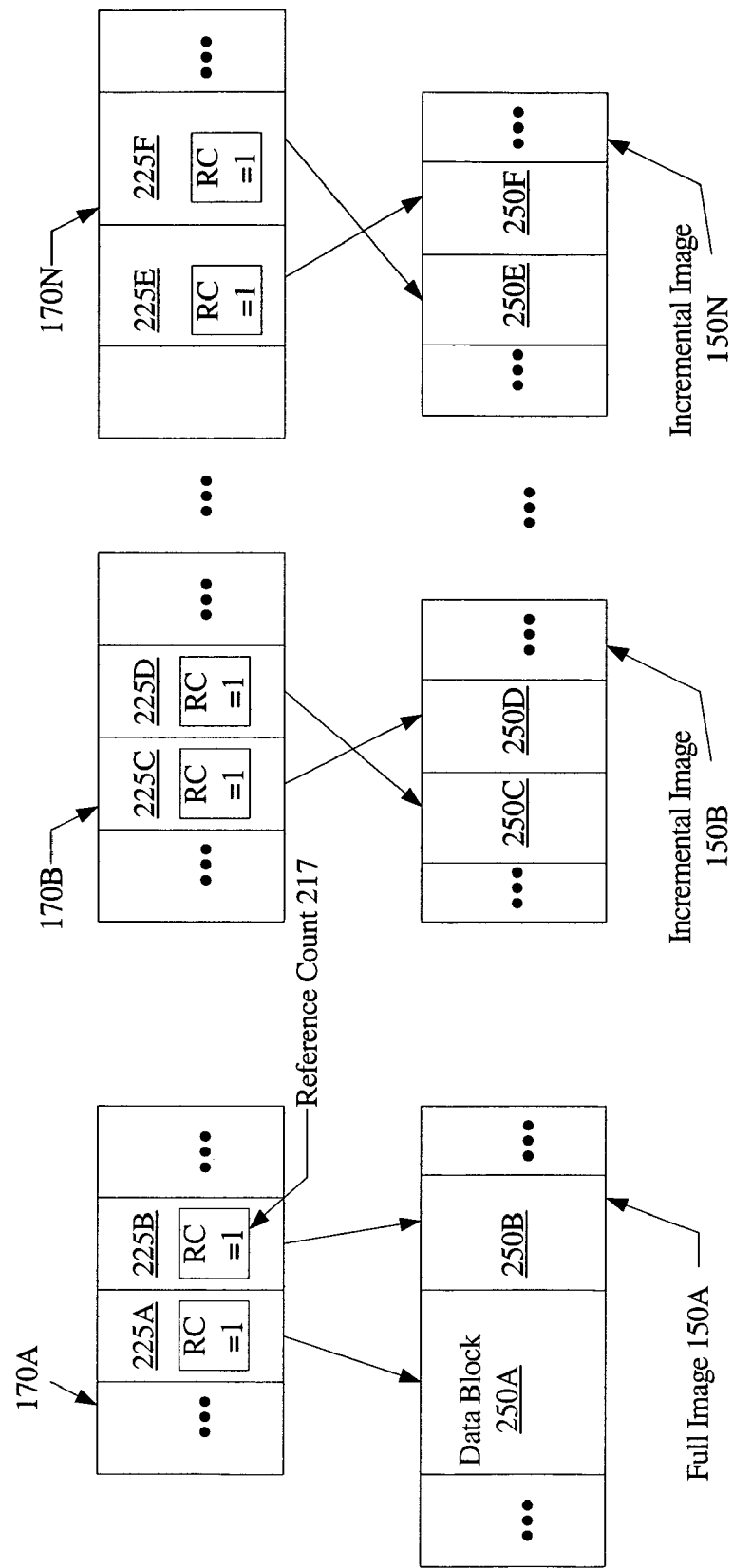
FIG. 6*a*, FIG. 6*b* and FIG. 6*c* are block diagrams illustrating modifications made to reference counts of exemplary image map entries when new aggregate image maps are created, according to one embodiment.
Figure 6B:
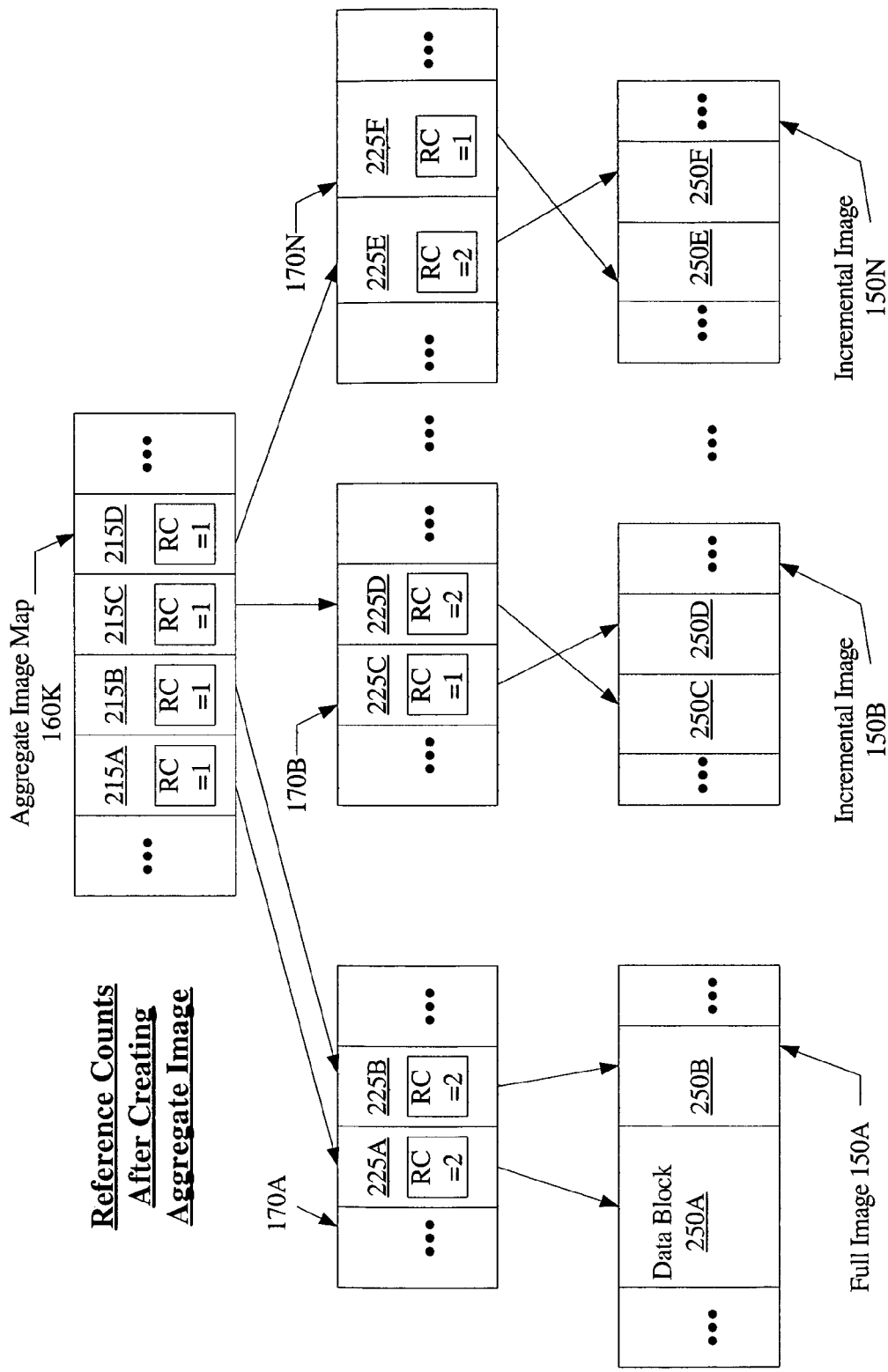
Figure 6C:
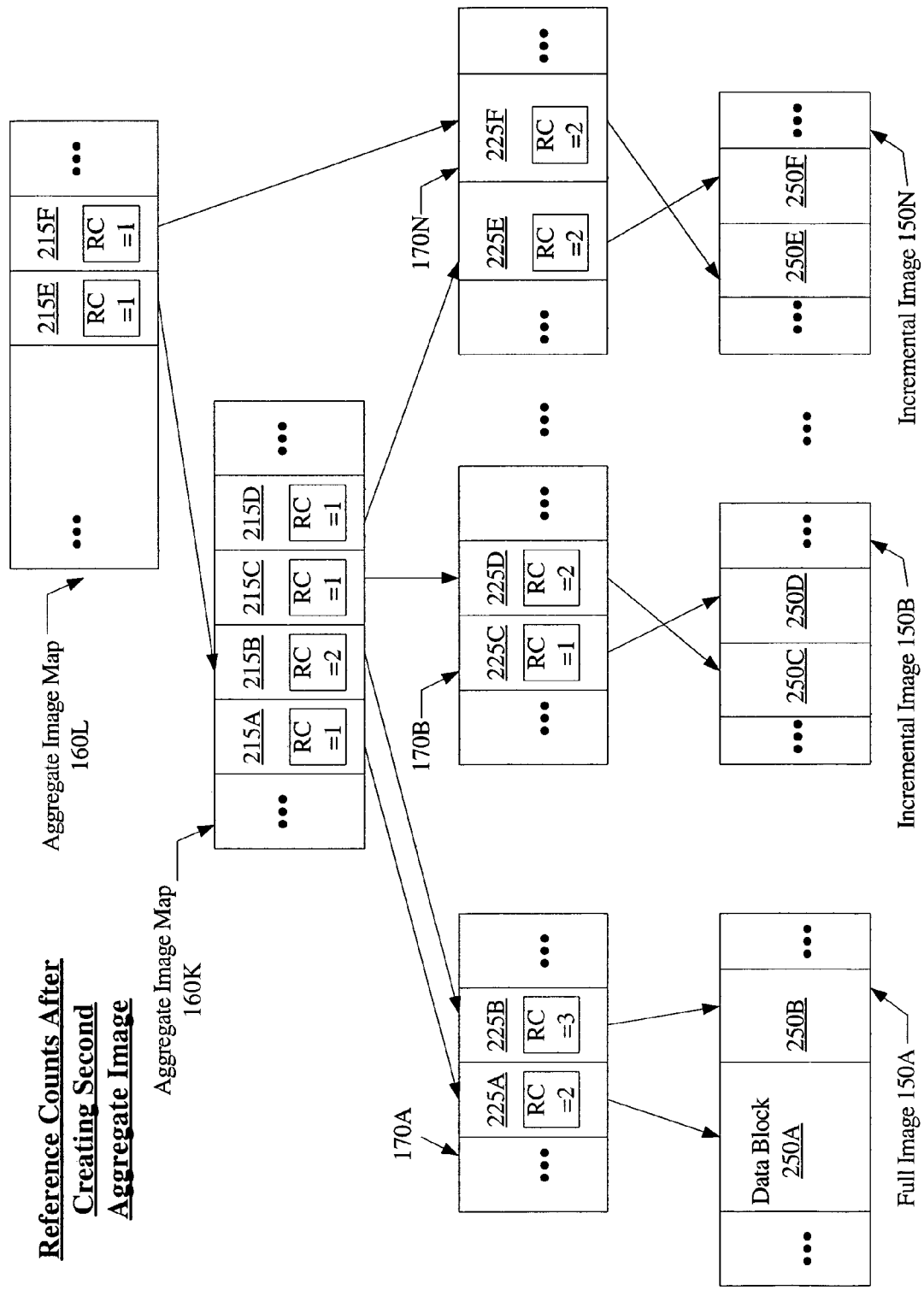

FIG. 6a-FIG. 6c are block diagrams illustrating modifications made to reference counts 217 of exemplary image map entries 225 (and 215) when new aggregate image maps 160 are created, according to one embodiment. FIG. 6a illustrates a chain of backup images, including full image 150A and incremental images 150B and 150N, prior to an establishment of an aggregate backup image. Image map entries 225A and 225B of image map 170 point to data blocks 250A and 250B of full image 150A respectively. Image map entries 225C and 225D of image map 170B point to data blocks 250D and 250C of incremental image 150B respectively, and image map entries 225E and 225F of image map 170N point to data blocks 250F and 250E of incremental image 150N respectively. As shown, reference counts 217 (indicated by the abbreviation "RC") within entries 225A, 225B, . . . 225F of image maps 170A, 170B and 170N have each been initialized to "1".

FIG. 6b illustrates reference count modifications made when backup manager 120 establishes an exemplary aggregate image map 160K in response to a request to create an aggregate image, according to one embodiment. As shown, aggregate image map 160K includes image map entries 215A, 215B, 215C and 215D. Backup manager 120 may be configured to increment the reference count 217 of each entry within a backup image that is referenced by entries of the newly established aggregate image map 160K. For example, since entry 215A of aggregate image map 160K points to entry 225A of image map 170A, the reference count of entry 225A has been incremented to "2". Similarly, the reference counts of image entries 225B, 225E and 225F, which are each also pointed to by entries in newly created aggregate image map 160K, have also been incremented to "2". The reference count of entry 215A itself has been set to "1", as have the reference counts of other entries 215 in the newly established aggregate image map. The reference count of entry 225C in image map 170B has been left unchanged at its original value of "1", as has the reference count of entry 225F of image map 170N.

FIG. 6c is a block diagram illustrating further examples of changes made to image map reference counts 217 when a second aggregate image map 160L that refers to previously created aggregate image map 160K is established by backup manager 120, according to one embodiment. When a second or additional aggregate image map such as 160L is established, backup manager 120 may be configured to increment the reference count 217 within each image map entry 215 or 225 referenced either directly or indirectly from the entries of the newly created image map. Thus, for example, since entry 215E within aggregate image map 160L references entry 215B of aggregate image map 160K, and entry 215B in turn references entry 225B in image map 170A, the reference counts of both entry 215B and entry 225B are incremented. The new value of the reference count of entry 215B is "2" in the embodiment illustrated in FIG. 6c, while the new value of the reference count of entry 225B is "3". In FIG. 6c, a second entry 215F within aggregate image map 160L refers to entry 225F of image map 170N, and as a result the reference count of entry 225F has also been incremented by backup manager 120 to a new value of "2".

Figure 7A:
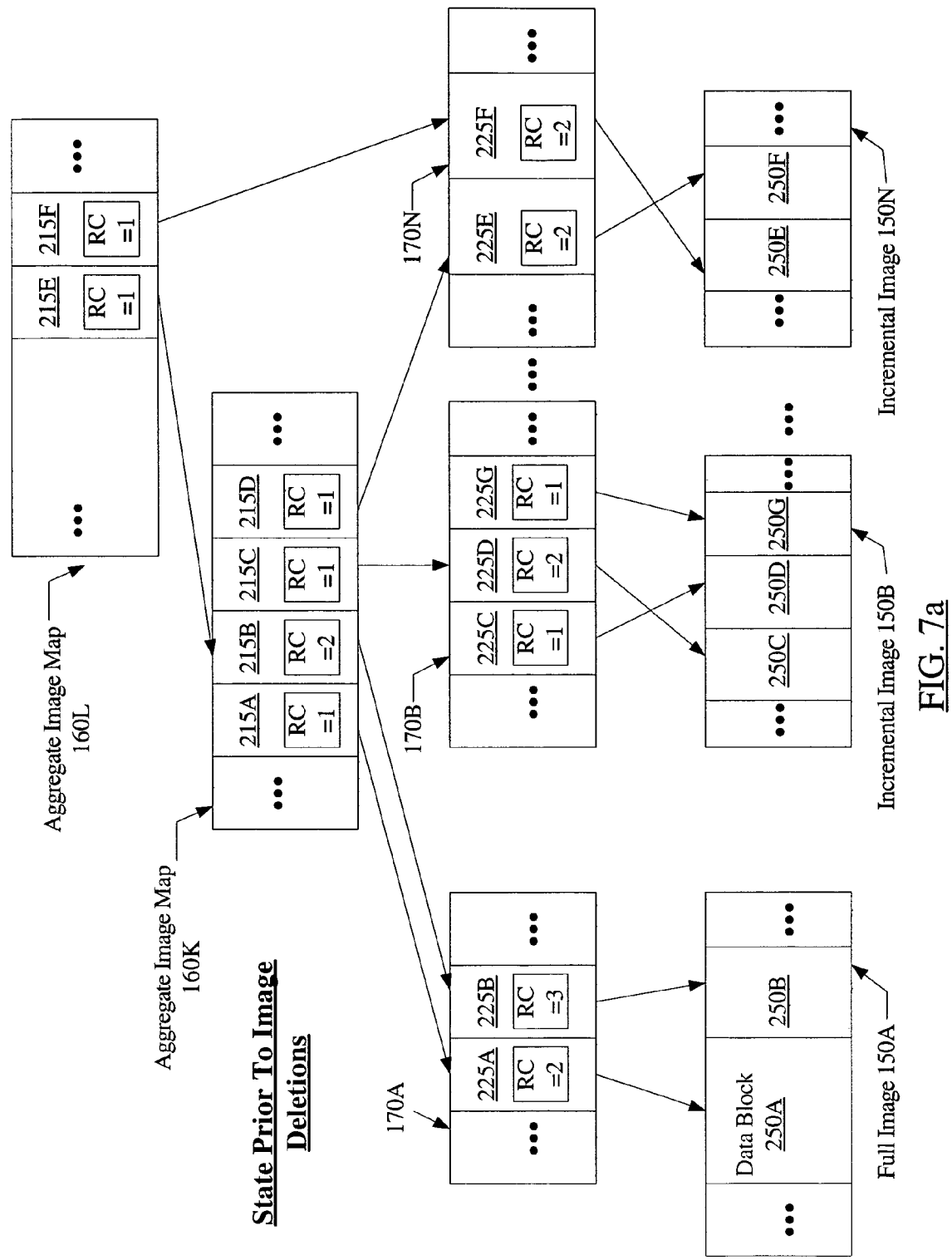

FIG. 7a-FIG. 7e are block diagrams illustrating exemplary operations that may be performed during deletion operations on backup images and their respective image maps, according to one embodiment. FIG. 7a illustrates a set of exemplary image maps, including aggregate image map 160L that includes a pointer to another aggregate image map 160K. In addition, image maps 170A, 170B and 170N corresponding to a full backup image 150A and incremental images 150B and 150N respectively. Various backup images and their associated maps, including full, incremental and aggregate backup images, may be scheduled for deletion as desired, for example based on deletion schedules that are independent of deletion schedules for other images. However, because entries within aggregate image maps 160 may refer to entries in other maps, reference counts 227 may be used to ensure that currently referenced image map entries and corresponding data blocks do not get inadvertently deleted in embodiments such as those depicted in FIG. 7a-FIG. 7e.

In response to a request to delete the aggregate image corresponding to aggregate image map 160K, for example, as shown in FIG. 7b, backup manager 120 may be configured to decrement the reference count within each entry 215 of aggregate image map 160K. Thus, the reference count of entries 215A, 215C and 215D of aggregate image map 160K may be decremented to "0", while the reference count of entry 215B may be decremented to "1". In some embodiments, reference counts of referenced image map entries (i.e., entries of image maps 170 such as one or more entries 225 that are pointed to by the entries of aggregate image map 160K) may also be decremented. For example, as shown in FIG. 7b, reference counts in entries 225A, 225B, 225D and 225E may also be decremented in response to a request to delete the aggregate image corresponding to aggregate image map 160K. In a hierarchy of image maps where entries of higher-level image maps (such as 160K) refer to entries within lower-level image maps (such as image maps 170), pointers within each layer of image maps may be recursively followed to the lowest layer of image maps, and entries encountered during the recursive traversal of the hierarchy may have their reference counts decremented. In some implementations, reference counts 217 may be decremented using a depth-first approach (i.e., the reference counts of the lowest-level entries may be decremented before the reference counts of higher-level entries are decremented), while in other implementations, the reference count of each entry may be decremented as soon as the entry is encountered during the traversal.

Figure 7C:
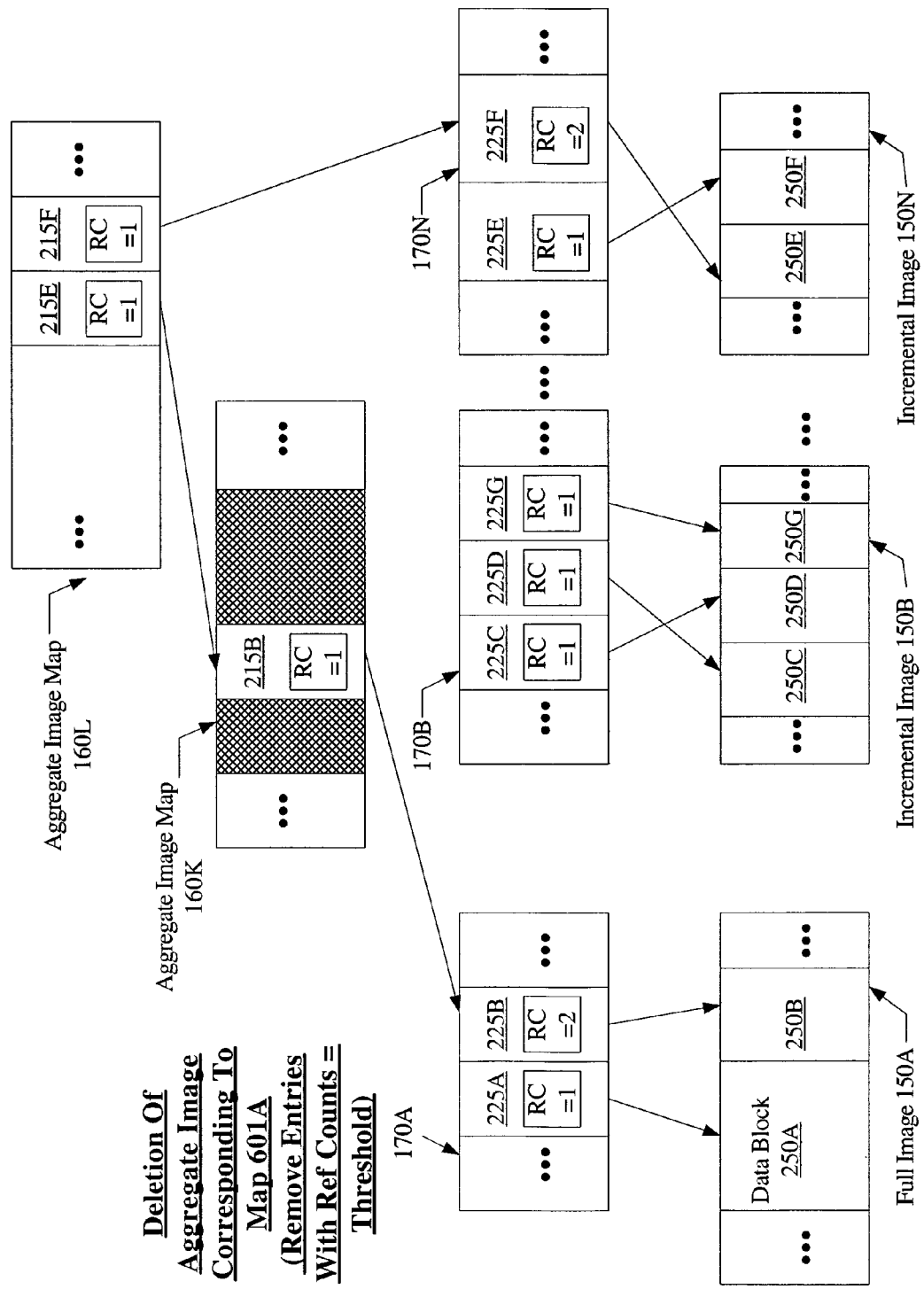

In some embodiments, if the decremented reference count 217 of an image map entry reaches a specified threshold value, the image map entry may be deleted by backup manager 120. FIG. 7c illustrates an example where the specified threshold value is "0", so backup manager 120 may be configured to logically and/or physically delete entries 215A, 215C and 215D (whose reference counts have been decremented to "0" as shown in FIG. 7b) from aggregate image map 160K, as indicated by the shaded regions of the aggregate image map 160K. A number of different techniques may be employed to implement the deletion of an image map entry in different embodiments. For example, in one embodiment, a validity indicator such as a valid bit may be maintained for each image map entry, and the validity indicator may be modified to logically indicate the deletion of the corresponding image map entry. In another embodiment, an image map 160 or 170 may be physically reorganized when entries are deleted, e.g., by creating a new image map without the deleted entries.

Figure 7D:
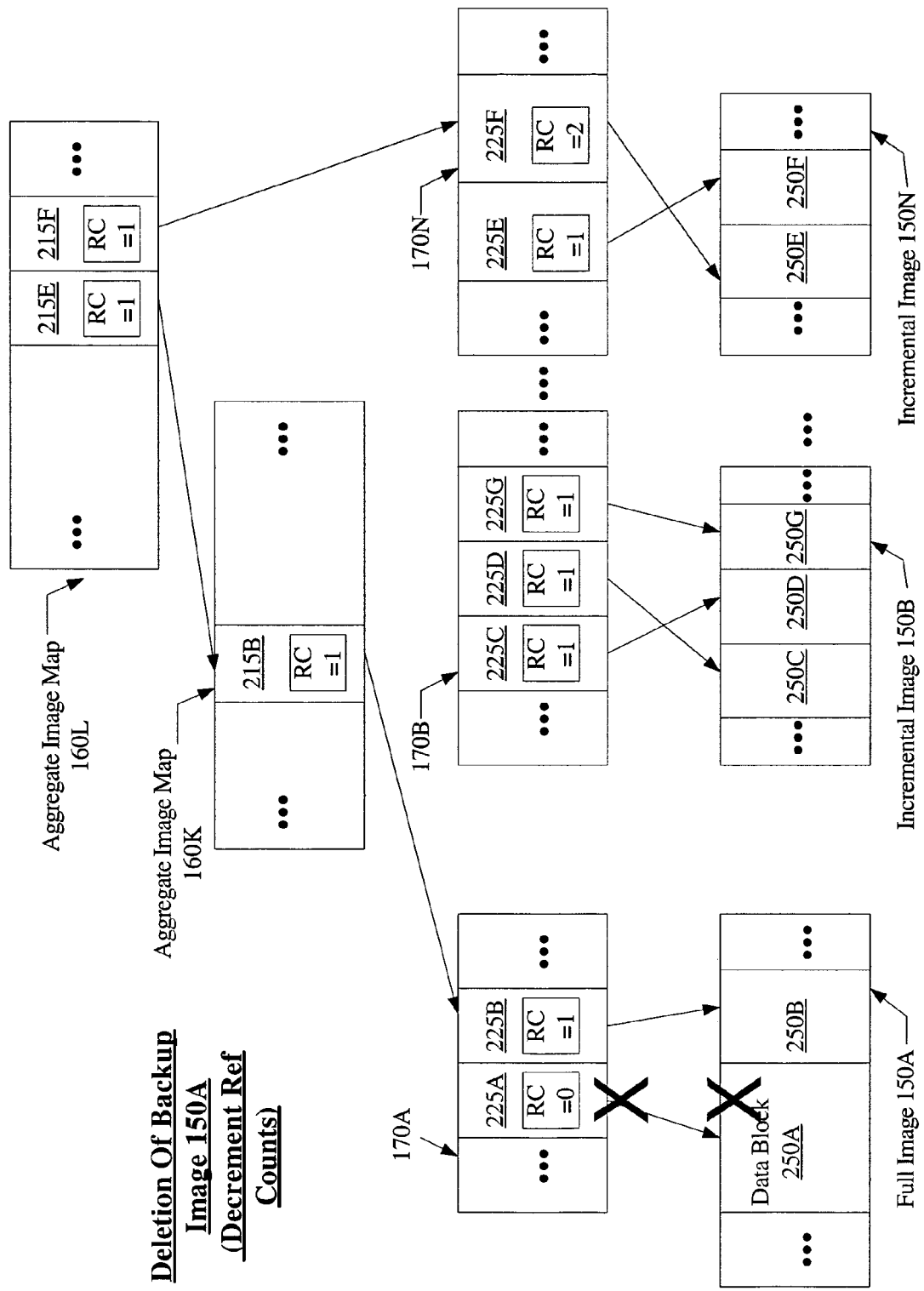
Figure 7E:
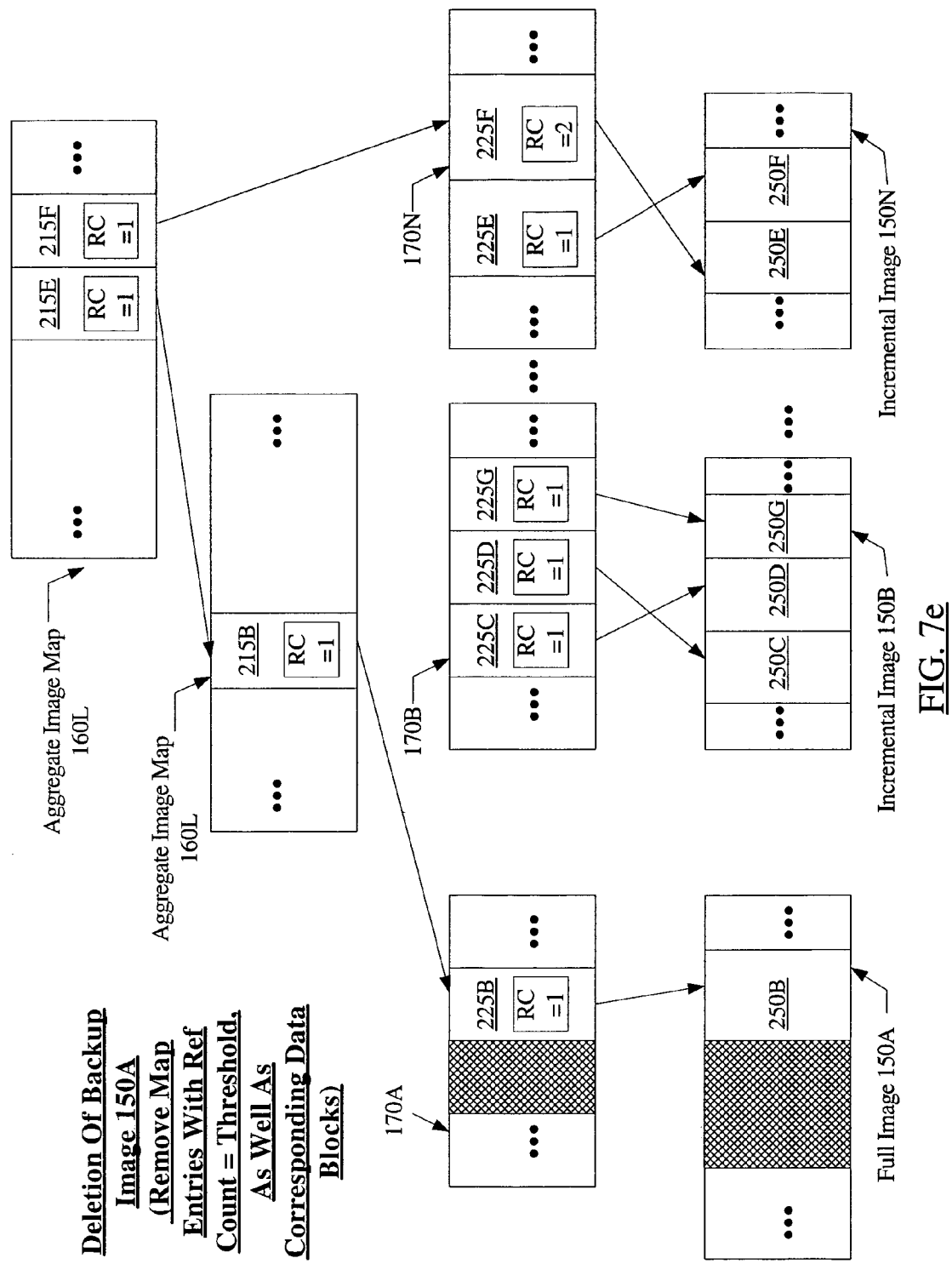

If backup manager 120 receives a request to delete a lower-level backup image, such as full image 150A, a similar technique of decrementing reference counts for each entry in the corresponding image map may be employed, as illustrated in FIG. 7d for one embodiment. Backup manager 120 may decrement the reference counts in entries 225A and 225B to "0" and "1" of image map 170A respectively in response to a request to delete image 150A. In some embodiments, if the decremented reference count for an image map entry such as 225A that references a data block 250A of the corresponding backup image 150A reaches a specified threshold (such as "0"), the data block may also be deleted by backup manager 120. The shaded regions within image map 170A and within full image 150A in FIG. 7e indicate a deleted image map entry (225A) and a corresponding deleted data block (225A). In one embodiment, if reference counts 217 of all the entries of a particular image map reach the specified threshold after being decremented in response to a deletion request, the entire image map may be deleted, and the corresponding full, incremental or aggregate image and its associated metadata may also be deleted.

With reference to FIGS. 7a-7e, it is noted that in response to the request to delete the aggregate backup image corresponding to aggregate image map 160K, backup manager 120 is configured to retain, rather than delete, image map entries (such as 215B) whose decremented reference counts indicate that the entries are still being referenced or pointed to by other backup images (such as by the aggregate image corresponding to aggregate image map 160L). Similar considerations prevent the deletion of entries within image maps 170, such as entry 225B, when backup manager 120 receives a request to delete a full and/or an incremental image 150. In this manner, reference counts 217 may be used to prevent the inadvertent deletion of still-referenced image map entries. At the same time, by implementing the condition that if a decremented reference count reaches a threshold value, the corresponding image map entry and/or the corresponding data block within a backup image is to be deleted, backup manager 120 may help to reduce the amount of storage dedicated to redundant and/or unused portions of backup images and image maps.

Figure 8:
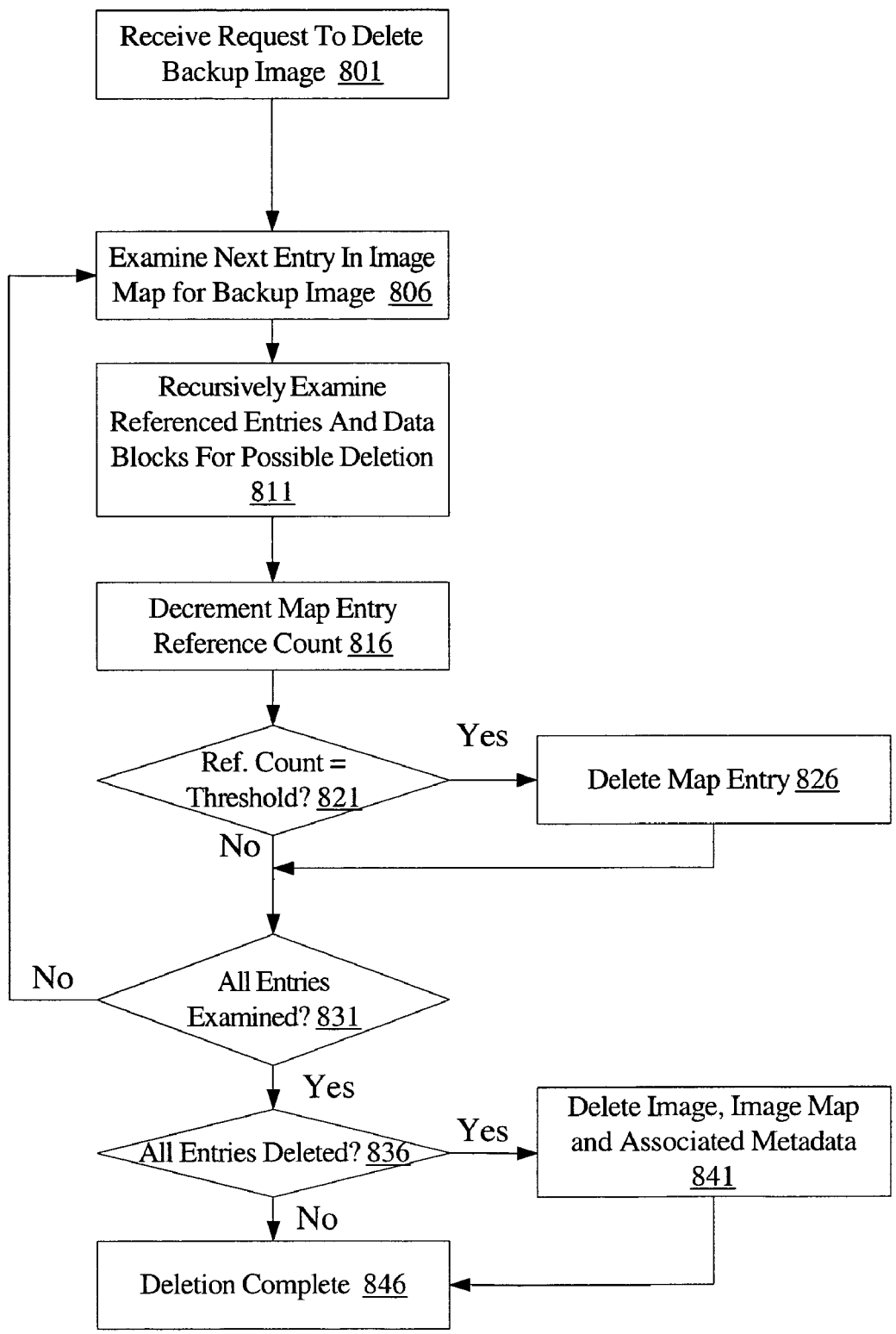
FIG. 8 is a flow diagram illustrating aspects of the operation of a backup manager in response to a request to delete a backup image, according to one embodiment.

FIG. 8 is a flow diagram illustrating aspects of the operation of backup manager 120 in response to a request to delete a backup image (which may be a full image, an incremental image or an aggregate image), according to one embodiment. Upon receiving the request to delete a given backup image (block 801 of FIG. 8), backup manager 120 may be configured to retrieve the image map 160 or 170 and examine the entries 225 or 215 in the image map. In some embodiments, the entries in the image map may be examined in sequence, while in other embodiments, especially if the number of entries in the image map is large, multiple entries may be examined in parallel (e.g., using multiple threads or processes). When a given image map entry 225 or 215 is examined (block 806), a recursive examination of entries referenced by the given image map entry and/or data blocks referenced by the given image map entry may be performed (block 811) for possible deletion in some embodiments. Further details of such a recursive examination of referenced entries are provided below, in conjunction with the description of FIG. 9. After the referenced entries have been examined for possible deletion, the reference count for the given map entry may be decremented, as shown in block 816.

In the embodiment depicted in FIG. 8, if the decremented reference count is found to have a threshold value such as '0' (as detected in decision block 821), the given image map entry 225 or 215 may be deleted from the image map (block 826). In some embodiments, as noted earlier, the image map entry may be only logically deleted, e.g., by modifying a valid bit or other indicator, while in other embodiments, the image map entry may also be physically deleted, e.g., by rewriting the image map. In one specific embodiment, image map entries whose reference counts have reached the threshold value may be marked for deletion (e.g., using a bitmap) during the examination of the image map, and marked entries may be physically deleted by rewriting the image map after the examination of the image map is completed. After all the image map entries have been examined (as detected in decision block 831), if all the entries have been deleted or marked for deletion (as detected in decision block 836), the corresponding image and associated data structures (e.g., any metadata maintained for the image as well as the image map, and the image map itself) may be deleted (block 841). If all the entries have not been examined, the next image map entry 225 or 215 may be examined and the operations corresponding to blocks 806, 811, 816, 821 and 826 repeated, until all the entries have been examined and the deletion operation is complete (block 846). It is noted that in other embodiments, some of the operations illustrated in FIG. 8 may be performed in a different order than that illustrated in FIG. 8, and in some embodiments not all the steps illustrated in FIG. 8 may be performed. For example, in one embodiment, the recursive examination of referenced entries and data blocks (block 811) may be performed after the reference count of the given image map entry being examined is decremented (block 816) and/or after the image map entry is deleted if its reference count reaches a threshold value (block 826).

Figure 9:
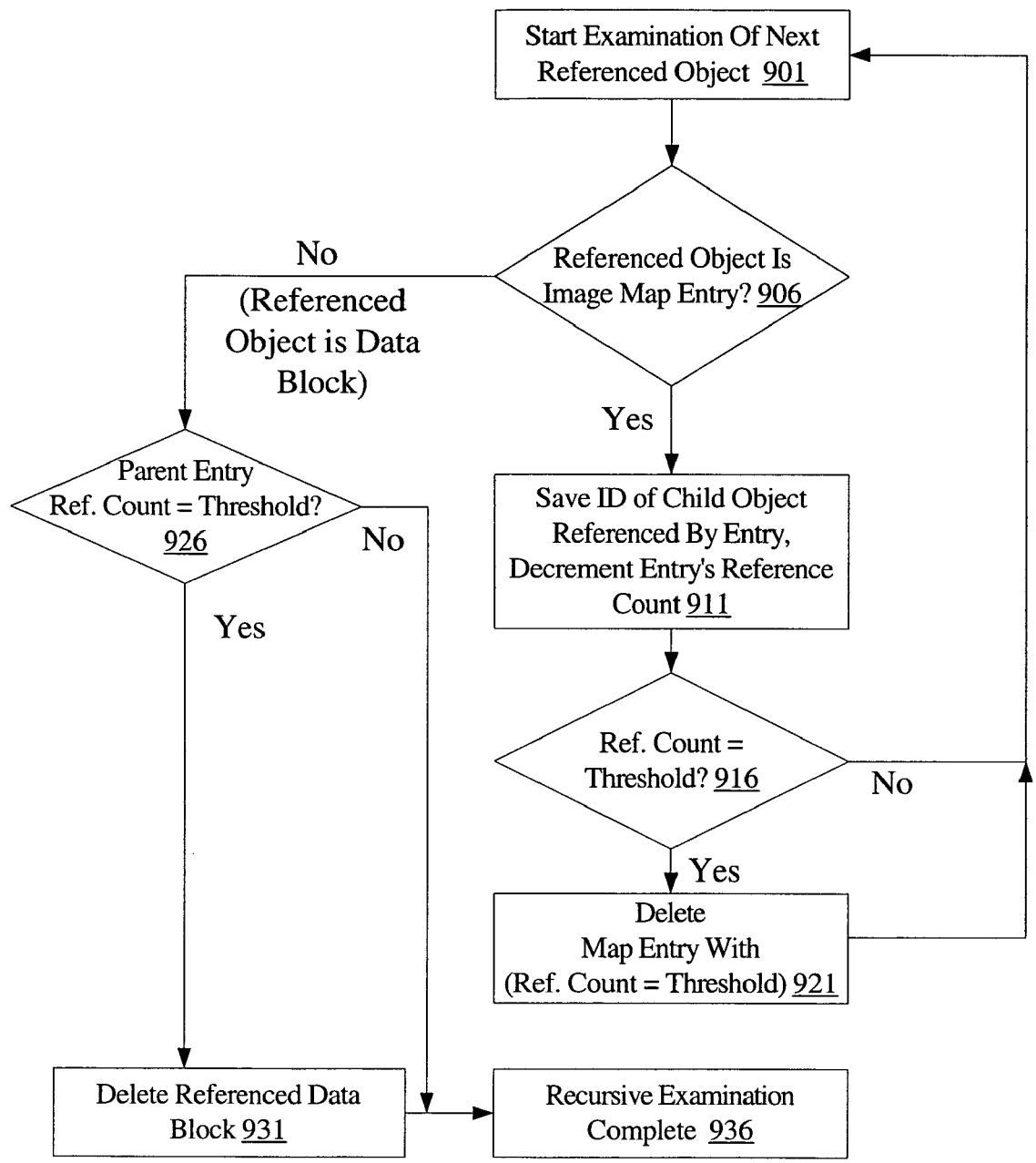
FIG. 9 is a flow diagram illustrating aspects of the operation of a backup manager during a recursive examination of image map entries and/or data blocks referenced by a given image map entry for possible deletion, according to one embodiment.

FIG. 9 is a flow diagram illustrating aspects of the operation of backup manager 120 during a recursive examination of image map entries and/or data blocks referenced by a given image map entry for possible deletion (e.g., during operations corresponding to block 811 of FIG. 8), according to one embodiment. The examination of a given referenced object (image map entry 215 or 225 or data block 250) may begin (block 901) with a determination of whether the referenced object is an image map entry or a data block (as detected in decision block 906). If the referenced object is an image map entry, it may refer to another object (either another image map entry or a data block). An identifier, pointer or other handle to the child object referenced by the image map entry may then be saved (block 911) and the image map entry's reference count 217 may be decremented. If the decremented reference count has a value equal to a specified threshold (as detected in decision block 916), the image map entry may then be deleted (block 921) in some embodiments. The identifier, pointer or other handle to the child object referenced by the image map entry may then be used to recursively examine the child object as the next referenced object (i.e., operations corresponding to blocks 901, 906, etc. may be performed for the child object). If the referenced object is a data block (as also detected in decision block 906), and if the parent image map entry of the data block has a reference count 217 equal to a specified threshold (as detected in decision block 926), in some embodiments the data block may itself be deleted (block 931). The recursive examination of referenced entries may then terminate (block 936). It is noted that, as in the case of the operations illustrated in FIG. 8, in other embodiments, some of the operations illustrated in FIG. 9 may be performed in a different order than the order shown in FIG. 9 (or not performed at all)—for example, the recursive examination of child image map entries or data blocks may be performed prior to the decrementing of a parent entry's reference count.

As noted earlier, the source data set 115 for which backup manager 120 may be configured to establish an aggregate backup image map 160 may include a variety of logical and physical storage devices, such as one or more file systems, a collection of files, database tablespaces, logical volumes, raw devices, LUNs, disk arrays, and the like. In addition, the formats in which various full and incremental images and image maps for full, incremental and aggregate images are laid out or arranged may also vary in different embodiments. In some embodiments, for example, a full or incremental image may be organized as a single file that includes both data and metadata for a set of backed-up files of one or more file systems. Since metadata (e.g., file attributes such as ownership, access control lists and the like) may be saved in the backup image along with the data of the backed-up objects, the full or incremental image may be larger in size than the combined size of the backed-up objects in such embodiments. Incremental images may be organized as file-incremental (e.g., storing changes made to each file as a unit) or block-incremental (e.g., storing changes made to each changed data block at a per-block level) in different embodiments. Backup images, including full and incremental images 150, their associated image maps 170 and metadata, as well as aggregate image maps 160 and their associated metadata may be stored on any desired combination of logical and physical storage devices in various embodiments, including random-access physical storage devices such as disks, disk arrays, etc. as well as tape-based or other sequential-access devices.

FIG. 10 is a block diagram illustrating a computer accessible medium 1010, according to one embodiment. The computer accessible medium 1010 may include backup software 1020 executable to implement the functionality of backup manager 120 as described above. Generally speaking, a computer accessible medium may include any media accessible by a computer during use to provide instructions and/or data to the computer. For example, a computer accessible medium may include storage media such as magnetic or optical media, e.g., disk (fixed or removable), CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc., as well as media accessible via transmission media or signals such as electrical, electromagnetic, or digital signals, conveyed via a communication medium such as a network and/or a wireless link. In some embodiments, backup software 1020 may be included within an operating system, volume manager, or another software package. It is noted that in other embodiments, some portions or all of the functionality of backup manager may be implemented by one or more hardware devices and/or by firmware.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
   a processor;
   a memory medium coupled to the processor which stores a plurality of backup images of a source data set, including a first backup image and a second backup image; and
   a backup manager;

wherein the second backup image comprises at least one data block containing an updated version of a corresponding data block in the first backup image;
   wherein the backup manager is configured to:
      maintain a first image map and a second image map corresponding to the first and second backup images, respectively, wherein each image map of the first and second image maps includes a plurality of entries pointing to data blocks of the corresponding backup image;
      in response to a request to create a first aggregate backup image of the source data set, establish a first aggregate image map including indirect pointers that point to one or more entries in each of the first and second image maps, wherein the indirect pointers reference most recently backed up versions of data blocks of the source data set; and
   wherein the plurality of backup images includes a third backup image, wherein the backup manager is further configured to:
      maintain a third image map corresponding to the third backup image including a plurality of entries pointing to data blocks of the third backup image; and,
      in response to a second request to create a second aggregate backup image of the source data set, establish a second aggregate image map including a first indirect pointer to an entry in the first aggregate image map and a second indirect pointer that points to an entry of the third image map.

2. The system as recited in claim 1, wherein the first backup image is a full image.

3. The system as recited in claim 1, wherein the second backup image is an incremental image.

4. The system as recited in claim 1, wherein each entry of the first and second image maps and the first aggregate image map includes a reference count indicative of a number of backup images that reference the entry.

5. The system as recited in claim 4, wherein, in generating the first aggregate backup image, the backup manager is further configured to:
   increment the reference count of each entry of the first and second image maps that is referenced by the first aggregate image map.

6. The system as recited in claim 4, wherein, in response to a request to delete the first aggregate backup image, the backup manager is further configured to:
   decrement the reference count of each entry of the first aggregate image map; and
   decrement the reference count of each entry of the first and second image maps that is referenced by the first aggregate image map.

7. The system as recited in claim 6, wherein the backup manager is further configured to:
   delete a particular entry of the first image map, the second image map or the first aggregate image map if the reference count of the particular entry reaches a specified threshold value after being decremented.

8. The system as recited in claim 7, wherein the backup manager is further configured to:
   delete a particular data block of the first backup image pointed to by the particular entry if the reference count of the particular entry reaches a specified threshold value after being decremented.

9. The system as recited in claim 4, wherein, in response to a request to delete the first backup image, the backup manager is configured to:
   decrement the reference count of each entry of the first image map; and if the reference count of a particular entry reaches a specified threshold value after being decremented, delete the particular data block of the first backup image referenced by the particular entry.

10. The system as recited in claim 1, wherein the at least one backup image of the plurality of backup images is stored in one or more random access storage devices.

11. The system as recited in claim 1, wherein the source data set includes at least one of: a logical volume, a raw device, a file, a file system, a database tablespace, and a LUN.

12. A method comprising:
maintaining a plurality of backup images of a source data set, including a first backup image, a second backup image, and a third backup image, wherein the second backup image comprises at least one data block containing an updated version of a corresponding data block in the first backup image;
maintaining a first image map and a second image map corresponding to the first and second backup images, respectively, wherein each image map of the first and second image maps includes a plurality of entries pointing to data blocks of the corresponding backup image;
in response to a request to create a first aggregate backup image of the source data set, establishing a first aggregate image map including indirect pointers that point to one or more entries in each of the first and second image maps, wherein the indirect pointers reference most recently backed up versions of data blocks of the source data set;
maintaining a third image map corresponding to the third backup image including a plurality of entries pointing to data blocks of the third backup image; and,
in response to a second request to create a second aggregate backup image of the source data set, establishing a second aggregate image map including a first indirect pointer to an entry in the first aggregate image map and a second indirect pointer that points to an entry of the third image map.

13. The method as recited in claim 12, wherein each entry of the first and second image maps and the first aggregate image map includes a reference count indicative of a number of backup images that reference the entry.

14. The method as recited in claim 13, further comprising:
in response to a request to delete the first aggregate backup image, decrementing the reference count of each entry of the first aggregate image map;
decrementing the reference count of each entry of the first and second image maps that is referenced by the first aggregate image map, and
deleting a particular entry of the first image map, the second image map or the first aggregate image map if the reference count of the particular entry reaches a specified threshold value after being decremented.

15. The method as recited in claim 14, further comprising:
deleting a particular data block of the first backup image pointed to by the particular entry if the reference count of the particular entry reaches a specified threshold value after being decremented.

16. The method as recited in claim 13, further comprising:
in response to a request to delete the first backup image, decrementing the reference count of each entry of the first image map; and
if the reference count of a particular entry of the first image map reaches a specified threshold value after being decremented, deleting the particular data block of the first backup image referenced by the particular entry.

17. A computer readable storage medium comprising program instructions, wherein the instructions are executable to:
maintain a plurality of backup images of a source data set, including a first backup image, a second backup image, and a third backup image wherein the second backup image comprises at least one data block containing an updated version of a corresponding data block in the first backup image;
maintain a first image map and a second image map corresponding to the first and second backup images, respectively, wherein each image map of the first and second image maps includes a plurality of entries pointing to data blocks of the corresponding backup image;
in response to a request to create a first aggregate backup image of the source data set, establish a first aggregate image map including indirect pointers that point to one or more entries in each of the first and second image maps, wherein the indirect pointers reference most recently backed up versions of data blocks of the source data set;
maintain a third image map corresponding to the third backup image including a plurality of entries pointing to data blocks of the third image map; and,
in response to a second request to create a second aggregate backup image of the source data set, establish a second aggregate image map including a first indirect pointer to an entry in the first aggregate image map and a second indirect pointer that points to an entry of the third image map.

18. The computer readable storage medium as recited in claim 17, wherein each entry of the first and second image maps and the first aggregate image map includes a reference count indicative of a number of backup images that reference the entry.

19. The computer readable storage medium as recited in claim 18, wherein the instructions are further executable to:
in response to a request to delete the first aggregate backup image,
decrement the reference count of each entry of the first aggregate image map;
decrement the reference count of each entry of the first and second image maps that is referenced by the first aggregate image map, and
delete a particular entry of the first image map, the second image map or the first aggregate image map if the reference count of the particular entry reaches a specified threshold value after being decremented.

20. The computer readable storage medium as recited in claim 19, wherein the instructions are further executable to:
delete a particular data block of the first backup image pointed to by the particular entry if the reference count of the particular entry reaches a specified threshold value after being decremented.

21. The computer readable storage medium as recited in claim 18, wherein the instructions are further executable to:
in response to a request to delete the first backup image,
decrement the reference count of each entry of the first image map; and
if the reference count of a particular entry of the first image map reaches a specified threshold value after being decremented, delete the particular data block of the first backup image referenced by the particular entry.

* * * * *